Sept. 18, 1962    F. LAESSKER    3,054,331
GEAR CUTTING MACHINE WITH CHAMFERING TOOL
Filed Jan. 14, 1960    4 Sheets-Sheet 1
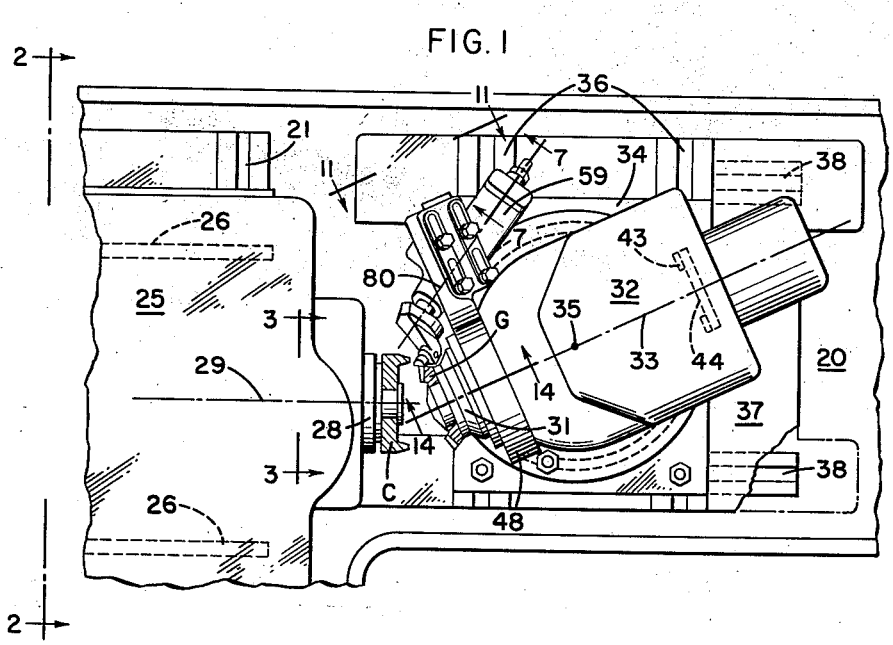
FIG. 1
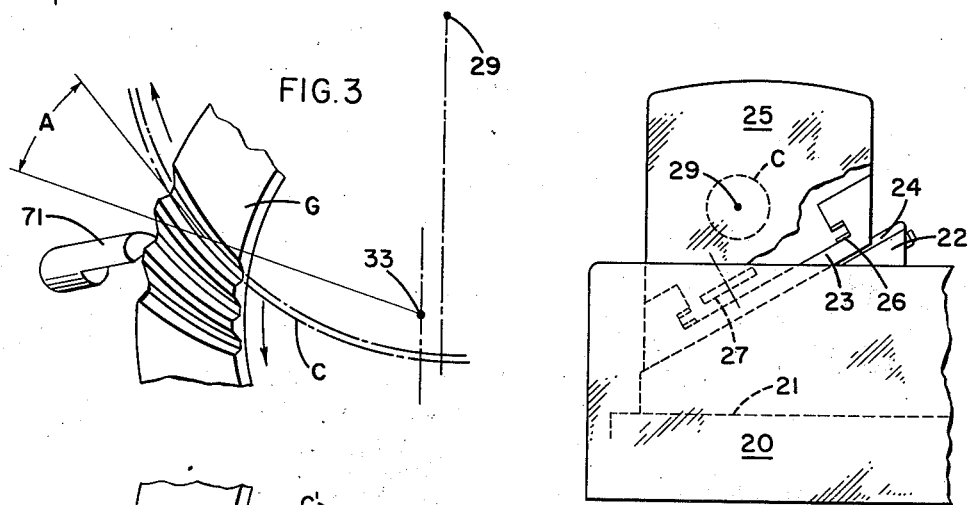
FIG. 3
FIG. 2
FIG. 4
INVENTOR.
FRITZ LAESSKER
BY
Richard W. Treverton
ATTORNEY

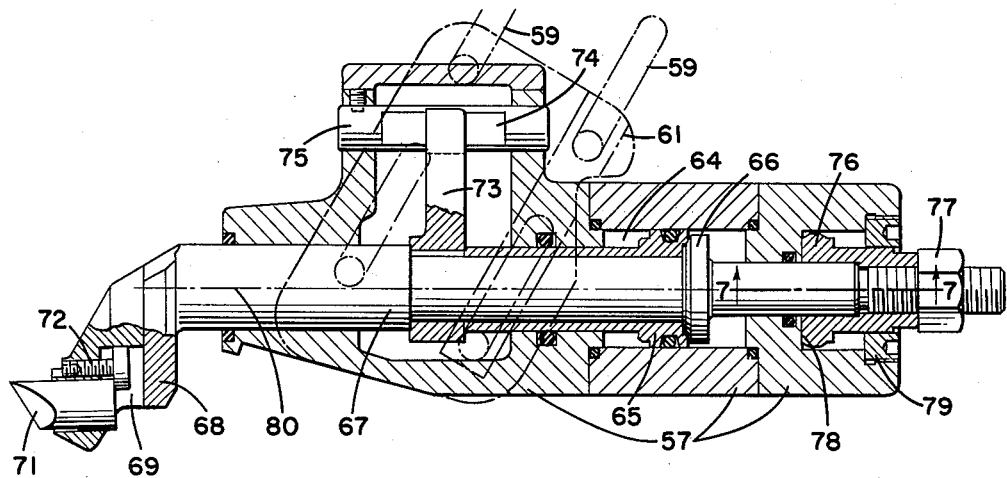
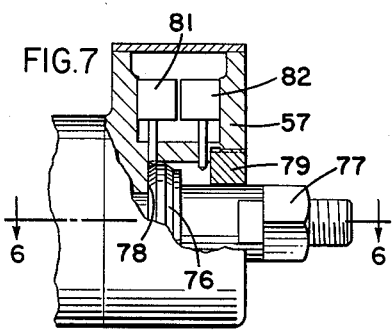
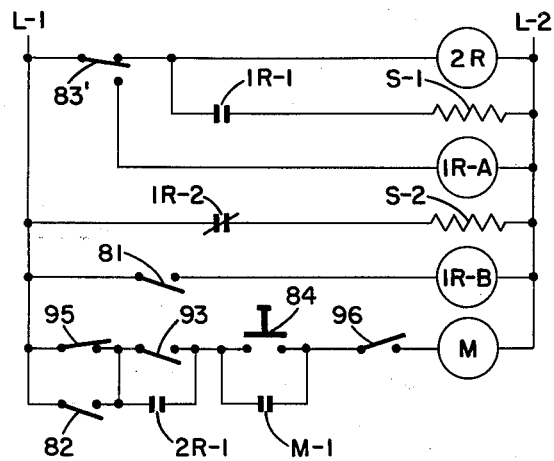
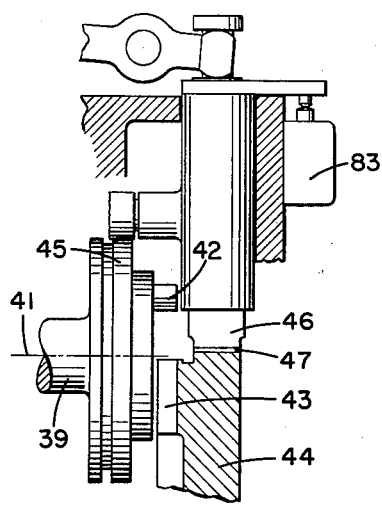
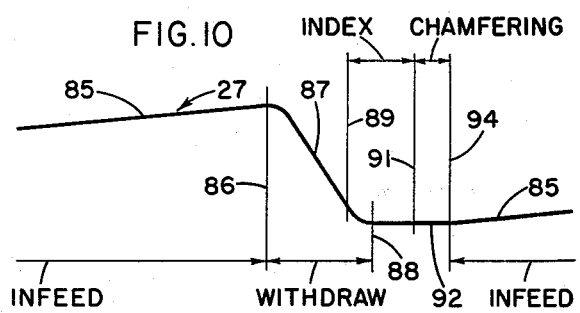

Sept. 18, 1962          F. LAESSKER          3,054,331

GEAR CUTTING MACHINE WITH CHAMFERING TOOL

Filed Jan. 14, 1960          4 Sheets-Sheet 4

United States Patent Office 3,054,331
Patented Sept. 18, 1962

3,054,331
GEAR CUTTING MACHINE WITH CHAMFERING TOOL
Fritz Laessker, Rochester, N.Y., assignor to The Gleason Works, Rochester, N.Y., a corporation of New York
Filed Jan. 14, 1960, Ser. No. 2,483
5 Claims. (Cl. 90—1.4)

The present invention relates to a machine for cutting gears, especially spiral bevel and hypoid gears, and has relation particularly to means for chamfering one side of each tooth slot immediately after it is cut.

The tooth slots of spiral bevel and hypoid gears are conventionally roughed out in one operation and then finished in a second operation. Roughing is performed with a face mill cutter whose blades pass from the inner end of the tooth slot to the larger outer end. The concave tooth sides are cut by the outside cutting edges of the cutter and they intersect the back cone of the gear at a sharp angle. Tenacious burrs are formed on these edges in the rough cutting. Moreover the sharp edges are hazardous to persons handling the gears and are apt to subsequently break away during heat treatment, or in finish lapping or in use of the gears, with danger of damage to machine parts or to the gears themselves. An object of the present invention is a chamfering means for removing these sharp edges, and any burrs on them, as the roughing operation proceeds, without appreciably increasing the over-all roughing time. A further object is such a chamfering means which will be adaptable to all or nearly all of the gears within the range of the gear roughing machine.

According to the invention the chamfering tool is carried by a piston that is reciprocable in a cylinder mounted on the work-spindle-supporting work head of the machine. The mounting means includes a support adjustable on the work head about the spindle axis and having an outwardly extending arm along which the cylinder is adjustable, in a direction approximately radial of said axis. By these adjustments the tool may be positioned for chamfering action in a tooth slot of the work gear that is one indexing pitch in advance of the position in which tooth slots are cut by the machine. Preferably there are valve means, operable by the work-spindle indexing mechanism of the machine, for applying fluid pressure to the cylinder to effect a chamfering stroke of the piston upon the completion of each indexing operation.

According to one aspect of the invention the axis of the cylinder is offset from the work spindle axis and inclined thereto at an acute angle, with the sense of the inclination such that the tool moves closer to the spindle axis during the chamfering stroke, enabling the tool to chamfer not only the acute edges at the outer ends of the teeth of the work gear but also the adjoining portions of the outer edges of the tooth bottoms.

The preferred embodiment of the invention is illustrated in the accompanying drawings, wherein:

FIG. 1 is a fragmentary plan view of the machine;

FIG. 2 is an end elevation of the machine, as viewed from plane 2—2 of FIG. 1;

FIGS. 3 and 4 are diagrams showing two different relationships of cutter, gear and chamfering tool as viewed from plane 3—3 of FIG. 1;

FIG. 6 is a longitudinal section through the cylinder and piston of the chamfering device, principally in plane 6—6 of FIG. 7;

FIG. 7 is a detail sectional view in plane 7—7 of FIGS. 1 and 6;

FIG. 8 is a sectional view through the index mechanism of the machine;

FIGS. 9 and 10 are respectively a wiring diagram and a cycle diagram;

Figure 5:
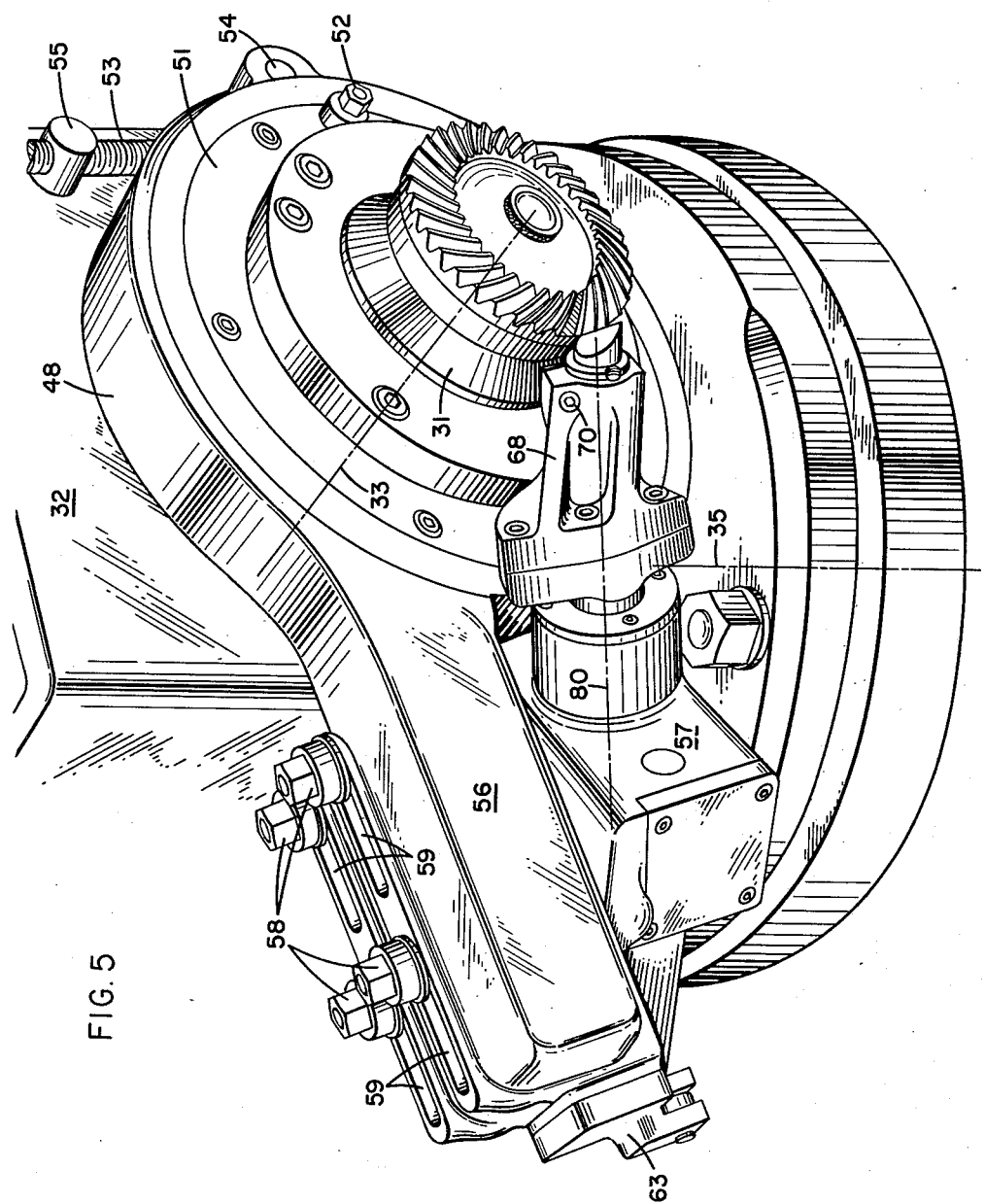
FIG. 5 is a perspective view of the chamfering device, the gear and the adjacent parts of the machine.

The basic machine shown in FIGS. 1, 2 and 8 may be substantially like that in co-pending application Serial No. 595,281, filed July 2, 1956, by L. O. Carlsen et al., now Patent No. 2,947,223, granted August 2, 1960. The machine comprises a frame 20 having transverse horizontal ways 21 along which a cutter head cross-slide 22 is adjustable. A cutter head base 23 is adjustable along inclined ways 24 on the cross-slide, and a cutter head 25 is movable back and forth on the base 23 along longitudinal horizontal ways 26 by means of a rotary feed cam 27, FIGS. 2 and 10. The cutter head journals a spindle 28 supporting face mill cutter C for rotation about axis 29 which is parallel to ways 26. Upon each infeed, to the right in FIG. 1, the cutter produces a tooth slot in a spiral bevel or hypoid gear blank G.

The gear G is chucked on a work spindle 31 that is rotatable in work head 32 to effect tooth-to-tooth indexing about axis 33, one such indexing operation occurring upon each withdrawal of the cutter head, after the cutting of each tooth slot. The work head is adjustable on a horizontal cross-slide 34 about a vertical axis 35 which intersects work axis 33. The cross-slide 34 is adjustable on transverse horizontal ways 36 on a sliding base 37. The latter is adjustable along longitudinal ways 38 to position the gear G for cutting, and is also adjustable along these ways to shift the work head between such cutting position and a loading and unloading position for the gear.

By the several adjustments described, gears of any design within the range of the machine may be positioned for cutting. For example, referring to FIG. 3 a gear G may be positioned with its axis 33 sufficiently below the cutter axis 29 for the cutting of tooth slots of right hand spiral angle A; or, referring to FIG. 4, it may be positioned at G' with its axis above that of cutter C' to produce tooth slots of left hand spiral angle A'. As shown by the arrows in FIGS. 3 and 4, the direction of rotation of the cutter is such that the cutting blades pass from the inner to the outer end of the tooth slot being cut, and the rotation of the gear, for indexing, is in the opposite direction.

The same motor which drives feed cam 27 also actuates the drive shaft 39, FIG. 8, of the indexing mechanism. This shaft, which moves angularly about axis 41, has a drive pin 42 adapted to intermittently engage in one of a plurality of radial slots 43 of an index plate 44 located in work head 32, FIG. 1, and secured to the work spindle 31. During each such engagement the pin 42 rotates the work spindle through an angle equal to one pitch of the work gear G. As the pin enters a slot 43 a cam 45 on shaft 39 lifts an index lock pawl 46 from a notch 47 in the plate 44, and as it leaves the slot the cam allows the pawl to be lowered into the next notch 47 under the influence of pressure means (not shown).

Figure 13:
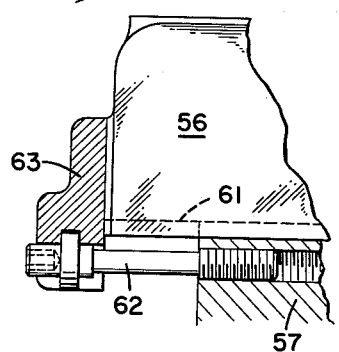
FIG. 13 is a detail section in plane 13—13 of FIG. 11.
Figure 14:
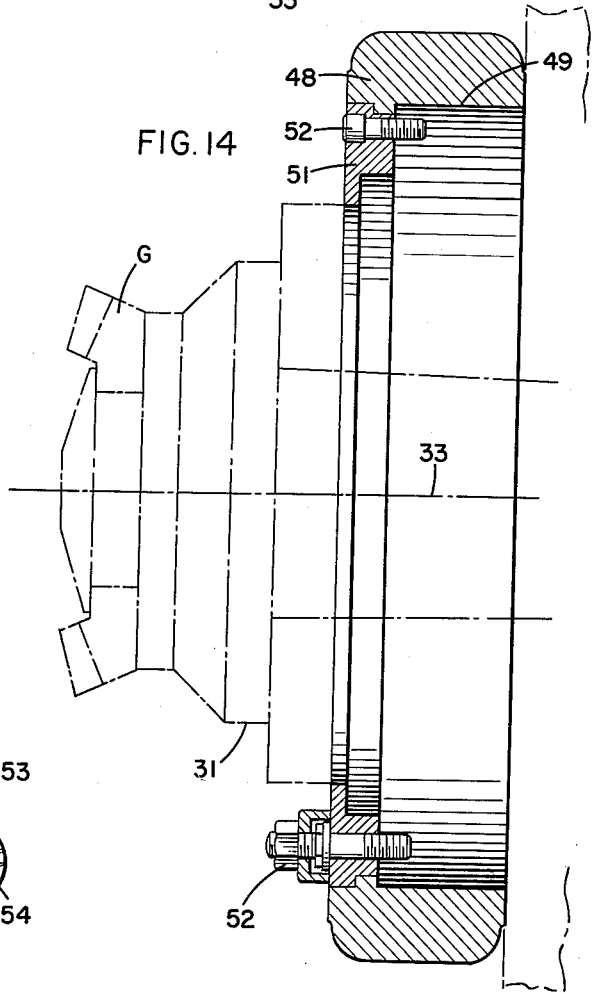
FIG. 14 is a section through the circular slide of the chamfering device in plane 14—14 of FIG. 1; and, FIG. 15 is a fragmentary front view, i.e. perpendicular to FIG. 14, showing adjusting means for the circular slide.
Figure 15:
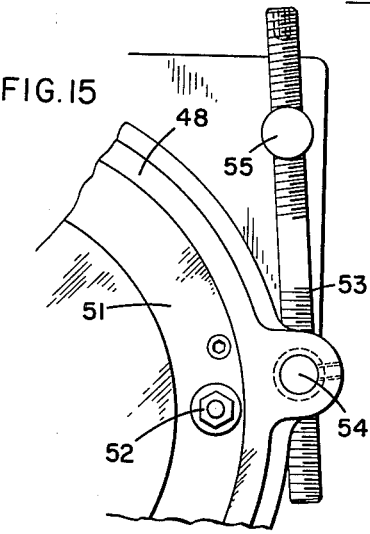

The chamfering device comprises a support 48 in the form of a circular slide having an internal cylindrical surface 49, FIG. 14, slidable on a complementary external cylindrical surface of work head 32, for adjustment about work spindle axis 33. The support is retained on the work head by a gib ring 51 that is secured by threaded fasteners 52, FIG. 14. Upon loosening of these fasteners the support 48 may be adjusted about axis 33 by means of a turnbuckle 53, FIGS. 5 and 15, which is connected to the support by pivot 54 and to the work head by pivot 55. The support includes an arm 56 to which a multipart cylinder housing 57 is secured by screw-threaded fasteners 58 which extend through elongated slots 59 in the arm. Upon loosening of these fasteners the housing may be adjusted, substantially radially of axis 33, along a guideway 61, FIGS. 6, 11 and 13, which extends along the bottom face of the arm. Such adjustment may be effected by turning a screw 62 which is threaded to the housing and has a head rotatably confined in a plate 63 secured to the outer end of the arm.

As shown in FIG. 6 the housing 57 has a cylinder 64 containing the head 65 of a tubular piston which is secured by means of a spanner nut 66 to a piston rod 67. The forward end of the rod has an integral flange 68 supporting a holder 69 for a chisel-pointed chamfering tool 71. The holder has a split socket for the cylindrical shank of the tool, the socket being clamped around the shank by a screw 70, FIG. 5. Upon loosening of the clamp screw the tool may be adjusted angularly as well as longitudinally in the socket by means of another screw, designated 72.

A yoke 73 keyed to the piston rod engages flats 74 of a guide pin 75 secured to the housing, for the purpose of holding the rod against rotation. An annular cam 76 is adjustably screw-threaded to the end of the rod opposite to the tool, and is secured by a lock nut 77. The cam by abutment with surface 78 of the housing, and against a retainer nut 79 screw-threaded into the end of the housing, limits the stroke of the piston and rod assembly. By adjusting the cam on the piston rod the tool can be adjusted toward or away from the housing, along rod axis 80, FIGS. 1, 5 and 6.

Figure 11:
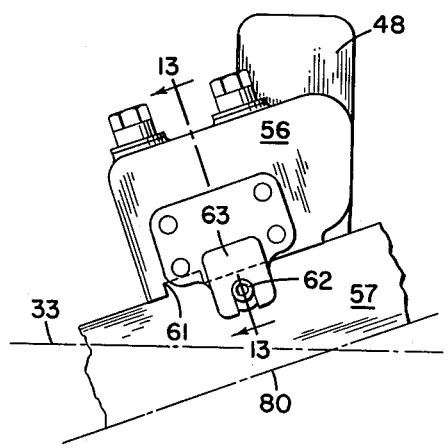
FIG. 11 is an elevation of the support arm for the chamfering cylinder projected into plane 11—11 of FIG. 1.
Figure 12:
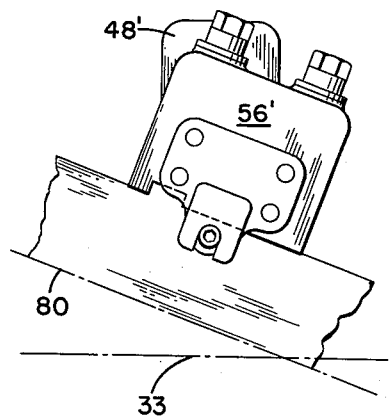
FIG. 12 is an elevation in the same plane as FIG. 11 but of a modified structure.

As shown in the last-mentioned views, and in FIG. 11, the axis 80, which is parallel to the cutting path of the tool, is inclined at an acute angle to, and is in offset, non-intersecting relation to the axis 33. As a result, the tool is able to chamfer the acute edge at the outer end of the concave side of the tooth and also the adjoining portion of the outer edge of the tooth bottom; and the chamfer surfaces form approximately equal angles with the tooth surfaces and the back cone of the gear. As shown, the gear is of right hand spiral, and in order to obtain the same advantageous chamfering action on gears of left hand spiral it is preferable to substitute, for the support 48, another support whose arm is oppositely inclined to arm 56 as the latter is viewed in FIG. 11. That is, as shown in FIG. 12, the preferable support 48' for use with gears of left hand spiral will have its arm 56' so inclined that the path of the chamfering tool while cutting, as reflected by the direction of axis 80, will be downwardly inclined, rather than upwardly inclined. In other words, for right hand gears the axis 80, FIG. 5, is preferably offset above axis 33 whereas for left hand gears it is preferably offset below axis 33. In both cases the same cylinder housing and piston assembly may be used, but of course the chamfering tools themselves must be of opposite hand.

In its front and back limit positions the cam 76 engages the actuating stems of limit switches 81 and 82, FIG. 7, secured to housing 57. These switches, together with a two-position limit switch 83, FIG. 8, which is actuated with the index locking pawl 46, and other instrumentalities shown in FIG. 9, actuate a reversing valve, not illustrated in detail but represented by solenoids S-1, S-2 in FIG. 9, to alternately apply hydraulic fluid under pressure to the opposite ends of cylinder 64 (through ports not shown) and thereby reciprocate the piston and tool assembly in time with the tooth slotting and indexing functions of the machine, as will now be described.

The machine is started by momentarily closing switch 84, FIG. 9, to establish a circuit between electric leads L-1 and L-2 through controller M of the motor that drives the feed cam and index mechanism. The controller is held energized by closing of its contacts M-1. As the feed cam 27 turns, its feed path 85, FIG. 10, causes infeed of cutter head 25 so that rotating cutter C produces a tooth slot in blank G. At position 86 of the feed cam the slot has been fully cut and the withdrawal path 87 of the cam then returns the cutter head, such action being concluded at position 88. Indexing action by drive shaft 39 and pin 42, FIG. 8, starts at position 89, FIG. 10, slightly before position 88, and ends at 91 while dwell 92 of the cam is effective. At position 89 the cam 45 has lifted pawl 46 and thereby moved contact 83' of switch 83 to its lower position (in FIG. 9), thereby energizing winding 1R-A of a latch relay to cause closing of contacts 1R-1 and opening of contacts 1R-2 of the relay. The movement of the switch contact 83' also deenergizes a relay 2R to cause its contacts 2R-1 to open, but the controller M is kept energized by a switch 93 which is closed between positions 89 and 91, this switch being controlled by a cam operating in time with the feed cam. At the conclusion of indexing, when index pawl 46 lowers, contact 83' returns to its upper position. This energizes relay 2R and solenoid S-1 of the control valve for cylinder 64, causing the right end of the cylinder to receive fluid under pressure and the left end to be opened to exhaust, so that the chamfering stroke of piston-tool assembly 65, 71 occurs. At the end of this stroke, limit switch 81 is closed, energizing winding 1R-B of the latch relay to cause its contacts 1R-1 to open and its contacts 1R-2 to close. This deenergizes solenoid S-1 and energizes solenoid S-2, causing the control valve to reverse the fluid connections to the cylinder 64 and thereby effect the return stroke of the chamfering tool. The fluid pressure employed is of such level that the cutting and return strokes of the tool are rapid, the return stroke being completed before the feed cam reaches position 94 where a new infeed of the cutter head begins. At position 94 a normally closed switch 95, operated in time with the feed cam, is momentarily opened. If by this time the limit switch 82 has not closed, signifying a failure of the chamfering tool to return, the circuit through the controller M will be broken and the machine will stop before another infeed occurs. After the cycle described has repeated for every tooth space of the gear G, a counting mechanism (not shown) causes a switch 96 to momentarily open, thus opening contacts M-1 and deenergizing controller M to end the cutting and chamfering operations, with the feed cam in position 94.

Having now described the improved machine and its mode of operation, what I claim as my invention is:

1. A machine for cutting gear teeth and the like comprising a work head supporting a work spindle and a cutter head supporting a tooth slot cutting tool, means for effecting relative adjustment of the heads to accommodate differently shaped workpieces, means for intermittently indexing the work spindle for the cutting of the successive tooth slots of a workpiece, and a chamfering device including a chamfering tool and a support therefor mounted on the work head, said support comprising a circular slide concentric with the axis of the work spindle and adapted for adjustment on the work head about said axis, an arm extending outwardly from said slide, and a cylinder adjustable along said arm approximately radially of said axis whereby the chamfering tool may be positioned for chamfering action in a tooth slot one indexing pitch in advance of tooth slot cutting position, and a piston reciprocable in the cylinder and carrying the chamfering tool.

2. A machine according to claim 1 having valve means operable by the indexing means for applying fluid pressure to the cylinder to effect a chamfering stroke of the piston upon the completion of each indexing operation.

3. A machine according to claim 1 in which the longitudinal axis of the cylinder is offset from axis of the work spindle and is inclined thereto at an acuate angle, with the sense of the inclination being such that the tool moves closer to the last-named axis during its chamfering stroke.

4. A machine according to claim 1 in which the work head has a cylindrical surface coaxial of the spindle axis, the circular slide completely encircles said axis and is in sliding contact with said surface, and there is a ring-shaped gib also completely encircling said axis and releasably secured to the work head for releasably clamping said slide to the work head.

5. A machine for cutting gear teeth and the like comprising a work head supporting a work spindle, said head having a surface of revolution concentric with the axis of the spindle, a slide supported on said surface of the work head and adjustable thereon about said axis, said slide having an arm extending outwardly therefrom, a cylinder adjustable along said arm approximately radially of said axis, a piston reciprocable in the cylinder, and a chamfering tool carried by the piston, the axis of the cylinder being offset from the axis of the work spindle and inclined thereto at an acute angle, with the sense of the inclination being such that the tool moves closer to the axis of the work spindle during its chamfering stroke.

References Cited in the file of this patent

UNITED STATES PATENTS 1,932,781    Hill _____ Oct. 31, 1933

FOREIGN PATENTS 807,155    Germany _____ June 25, 1951